United States Patent [19]

Yamada

[11] Patent Number: 4,814,682

[45] Date of Patent: Mar. 21, 1989

[54] DRIVE APPARATUS FOR SPECIMEN STAGE OF MICROSCOPE

[75] Inventor: Osamu Yamada, Katsuta, Japan

[73] Assignee: Hitachi, Ltd., Tokyo, Japan

[21] Appl. No.: 105,252

[22] Filed: Oct. 7, 1987

[30] Foreign Application Priority Data

Oct. 8, 1986 [JP] Japan ................... 61-237956

[51] Int. Cl.$^4$ .............................................. G05B 1/06
[52] U.S. Cl. ..................................... 318/640; 318/590; 318/603; 364/190
[58] Field of Search ....................... 318/640, 590, 603; 350/531; 364/190

[56] References Cited

U.S. PATENT DOCUMENTS 4,577,141 3/1986 Saiki et al. ..................... 318/590
4,624,537 11/1986 Hanssen et al. ................ 350/531

*Primary Examiner*—William M. Shoop, Jr.
*Assistant Examiner*—Saul M. Bergmann
*Attorney, Agent, or Firm*—Antonelli, Terry & Wands

[57] ABSTRACT

A drive apparatus for a specimen stage of a microscope suitable for handling specimens of a known shape or internal structural configuration. A coordinate position $(X_d, Y_d)$ on a two-dimensional coordinate designating means is made to correspond to coordinate positions $(X_s, Y_s)$ of a plurality of specimens of the same configuration on the specimen stage independently and selectively, thereby ensuring that correspondence between each of the plural specimens of the same configuration and a layout drawing of the specimen placed on the two-dimensional coordinates designating means can be set up accurately. A part desired to be observed of a specimen can therefore be moved quickly and easily into a very small field of view of the microscope.

3 Claims, 4 Drawing Sheets

DRIVE APPARATUS FOR SPECIMEN STAGE OF MICROSCOPE

BACKGROUND OF THE INVENTION

This invention relates to a drive apparatus for a specimen stage carrying specimens to be measured (observed) and more particularly to a specimen stage drive apparatus suitable for handling specimens of known shape or known internal structural configuration in a microscope such as an electron microscope or an optical microscope.

When observing a specimen of precedently known shape or internal structural configuration with an electron microscope or the like, it is conventionally widespread practice that a drawing or photograph illustrative of the specimen is used and brought into association with the movement of a specimen stage in some way in order that a part, desired to be observed, of the specimen can be moved quickly and easily into a very small field of view of the microscope. The specimen part desired to be observed is very small and hence the view field of the microscope is also very small measuring several of tens of microns to several mm.

One of conventional methods which are considered to be highly effective for moving a specimen to be observed into such a small field of view is disclosed in literature (1) of an English catalogue "IEEE COMPUTER SOCIETY REPRINT, ELECTRON BEAM TESTER WITH 10 ps TIME RESOLUTION, pp 601-606, ISSUED AT PROCEEDINGS OF INTERNATIONAL TEST CONFERENCE, Sept. 8 to 11, 1986" (especially, p 601, FIG. 3). A similar technique is disclosed in literature (2) entitled "High Speed E-Beam Tester", NIPPON GAKUJUTSU SHINKOHKAI, No. 132 IINKAI, No. 93 KENKYUKAI SHIRYO, Nov. 1985, pp 40-45 (especially p 43).

FIG. 1 is a schematic diagram illustrating a prior art drive apparatus for a specimen stage of a microscope as taught from either of the above literatures.

Referring to FIG. 1, a specimen stage 1 carrying a specimen 4 can be moved in two orthogonal directions (X-axis direction and Y-axis direction) by means of stepping motors 2 and 3 driven under the direction of a controller 5 comprised of a CPU. A mechanical coordinate system (Xs, Ys) for the specimen stage 1 is managed by the controller 5. When a desired position on the planar surface of a coordinate digitizer 6 constituting a two-dimensional coordinates designating means is designated by means of a stylus pen 7, the coordinate digitizer 6 delivers to the controller 5 coordinate values on plane coordinate system (Xd, Yd) which are representative of the position designated by the stylus pen 7. The coordinate digitizer 6 is typically equivalent to an input unit widely used in a computer and will not be detailed herein. The coordinate digitizer 6 is commercially available having the coordinates output planar surface which measures a size of about A4 to a larger size of A0. As shown in FIG. 1, a manual switch 9 is connected to the controller 5 and the stepping motors 2 and 3 are driven by the controller 5 during depression of the manual switch 9. More particularly, the stepping motor 2 is driven to move the specimen stage 1 in the horizontal direction (X-axis direction) while a horizontal push button 9x of the manual switch 9 is being depressed, and the stepping motor 3 is driven to move the specimen stage 1 in the vertical direction (Y-axis direction) while a vertical push button 9y of the manual switch 9 is being depressed. By depressing the horizontal and vertical push buttons 9x and 9y simultaneously, the specimen stage 1 can be moved in an oblique direction.

While the specimen 4 is placed on the specimen stage 1, a drawing 8 illustrative of an internal structural configuration of the specimen 4 is placed on the coordinate digitizer 6. For example, when the specimen 4 is a semiconductor integrated circuit, a copy on a reduced scale of a layout design figure of the circuit may be used as the drawing 8. If the specimen 4 could be placed accurately at a predetermined position on the specimen stage 1, and the drawing 8 could be placed accurately at a predetermined position on the coordinate digitizer 6 and the ratio between sizes of specimen 4 and drawing 8 could be determined accurately, the correspondence between the coordinate system (Xs, Ys) for specimen stage 1 and the coordinate system (Xd, Yd) on the coordinate digitizer 6 could be determined. Actually, however, it is almost impossible to accurately place the drawing 8 at a predetermined position on the coordinate digitizer 6 and to accurately determine the size ratio between specimen 4 and drawing 8. Under the circumstances, the correspondence between the two coordinate systems needs to be somehow set up and this can be accomplished in the following manner.

(1) If the specimen 4 is exemplified as an integrated circuit, a specified point on the circuit, for example, a corner of a bonding pad (point A in FIG. 2) is moved to the center of view field of the microscope by using the manual switch 9 and a corresponding point (point A' in FIG. 2) in the drawing 8 on the coordinate digitizer 6 is designated using the stylus pen. Through this operation, the controller 5 reads and stores mechanical coordinates $(Xs_1, Ys_1)$ for the specimen stage 1 and coordinates $(Xd_1, Yd_1)$ on the coordinate digitizer 6.

(2) Subsequently, a different specified point on the specimen 4, for example, a corner of another bonding pad (point B in FIG. 2) is moved to the center of view field of the microscope by means of the manual switch 9 and a corresponding point (point B' in FIG. 2) in the drawing 8 is similarly designated by the stylus pen 7. The controller 5 then reads coordinates $(Xs_2, Ys_2)$ and coordinates $(Xd_2, Yd_2)$ of the two points B and B'.

(3) Using four of the thus read coordinates $(Xs_1, Ys_1)$, $(Xd_1, Yd_1)$ and $(Xs_2, Ys_2)$, $(Xd_2, Yd_2)$, the controller 5 calculates, for the sake of setting up the correspondence between the coordinate system (Xs, Ys) for specimen stage 1 and the coordinate system (Xd, Yd) on the coordinate digitizer 6 expressed as $$Xs = K(Xd \cos\theta - Yd \sin\theta) + Xs_0 \quad (1)$$

$$Ys = K(Yd \cos\theta + Xd \sin\theta) + Ys_0 \quad (2),$$

parameters which are expressed as $$\left. \begin{array}{l} K = \sqrt{\dfrac{(Xd_2 - Xd_1)^2 + (Yd_2 - Yd_1)^2}{(Xs_2 - Xs_1)^2 + (Ys_2 - Ys_1)^2}} \\[2mm] \theta = \tan^{-1}\left(\dfrac{Xs_2 - Xs_1}{Ys_2 - Ys_1}\right) - \tan^{-1}\left(\dfrac{Xd_2 - Xd_1}{Yd_2 - Yd_1}\right) \\[2mm] X_0 = Xs_1 - K(Xd_1 \cos\theta - Yd_1 \sin\theta) \\[2mm] Y_0 = Ys_1 - K(Yd_1 \cos\theta + Xd_1 \sin\theta) \end{array} \right\} \quad (3)$$

where θ appearing in equations (1), (2) and (3) represents a relative angle between specimen 4 and drawing 8 as can be seen from FIG. 2. FIG. 2 explains the principle of coordinate conversion by illustrating the relative positional relationship between specimen 4 and drawing 8.

After completion of the above procedure, the controller 5 utilizes coordinate values on coordinate system (Xd, Yd) designated by the stylus pen 7 and delivered out of the coordinate digitizer 6 to calculate coordinate values on coordinate system (Xs, Ys) for the specimen stage, thereby driving the specimen stage 1.

In this manner, by manipulating the stylus pen 7 adapted to designate a desired position on the drawing, a corresponding point on the specimen 4 can be moved readily and quickly into the view field of the microscope.

Incidentally, in an application, the specimen measurement through the use of a microscope conducts itself with a view to comparing a plurality of specimens 4 having an identical structural configuration. For example, the apparatus disclosed in the literature (1) quoted hereinbefore measures voltage waveforms appearing in an integrated circuit and requires comparative measurement between an integrated circuit operating abnormally and an integrated circuit of the same configuration operating normally for the sake of rapid fault analysis. In the apparatus using an electron beam, a specimen is placed in vacuum and it takes a very long time to complete vacuum evacuation, requiring that desirably, non-defective and defective specimens to be compared with each other be placed on a specimen stage at a time. In such an instance, only either one of the two specimens, though the two specimens being designed to have exactly the same configuration, is permitted to be brought into correspondence with a layout drawing illustrative of the specimen.

This problem can be solved by accurately placing two identical layout drawings on the coordinate digitizer in exactly the same positional relation as that of two specimens on the specimen stage but this manner of solving is very difficult to achieve.

SUMMARY OF THE INVENTION

A major object of this invention is to provide a specimen stage drive apparatus capable of accurately bringing a layout drawing on the coordinate digitizer into correspondence with all of a plurality of specimens carried on the specimen stage which are designed to have an identical configuration and of moving quickly and readily a part, desired to be observed, of each specimen.

Another object of this invention is to provide a specimen stage drive apparatus capable of identifying defective portions by alternately observing corresponding parts of defective and non-defective specimens of the same layout which are concurrently placed on the specimen stage.

To accomplish the above objects, according to the invention, a coordinate value on the coordinate digitizer is not made to correspond to a coordinate value on the specimen stage in one-to-one relationship but is made to correspond to a plurality of coordinate values on the specimen stage independently and selectively.

According to the invention, a specimen stage drive apparatus for a microscope comprises:

a specimen stage carrying a plurality of specimens of the same structural configuration and movable in two-dimensional directions;

stepping motors connected to the specimen stage to move it in the two-dimensional directions;

two-dimensional coordinates designating means on which a drawing illustrative of an internal structural configuration of the specimens is placed;

a stylus pen for designating a desired position on the two-dimensional coordinates designating means;

a controller, connected between each pulse motor and the two-dimensional coordinates designating means, for correctionally setting up correspondence between a coordinate system (Xd, Yd) on the two-dimensional coordinates designating means and a coordinate system (Xs, Ys) for the specimen stage and for controlling the specimen stage such that it is moved to a coordinate position on the coordinate system (Xs, Ys) which corresponds to a designated coordinate position on the two-dimensional coordinates designating means;

a manual switch connected to the controller to drive the stepping motors; and a function selecting switch connected to the controller to perform selection of the specimens and coordinate correction, whereby a coordinate position on the two-dimensional coordinates designating means is made to correctionally correspond to a plurality of coordinate positions on the specimen stage independently.

Further, the controller is added with (1) a function of designating numbers representative of coordinates corresponding to respective plural specimens on the specimen stage, (2) a function of inputting coordinate values of two points on a specimen in respect of coordinates represented by a designated number, the two points being used for setting up the correspondence, (3) a function of calculating a set of parameters for coordinate conversion indicated by the aforementioned equation (3) and a function of separately storing sets of parameters associated with coordinates represented by respective numbers, and (4) a function of calculating coordinate values on the specimen stage from coordinate values designated by the stylus pen and delivered out of the coordinate digitizer in accordance with the aforementioned equations (1) and (2) by selecting a set of parameters associated with coordinates represented by a number and driving the specimen stage in accordance with the calculated coordinate values.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
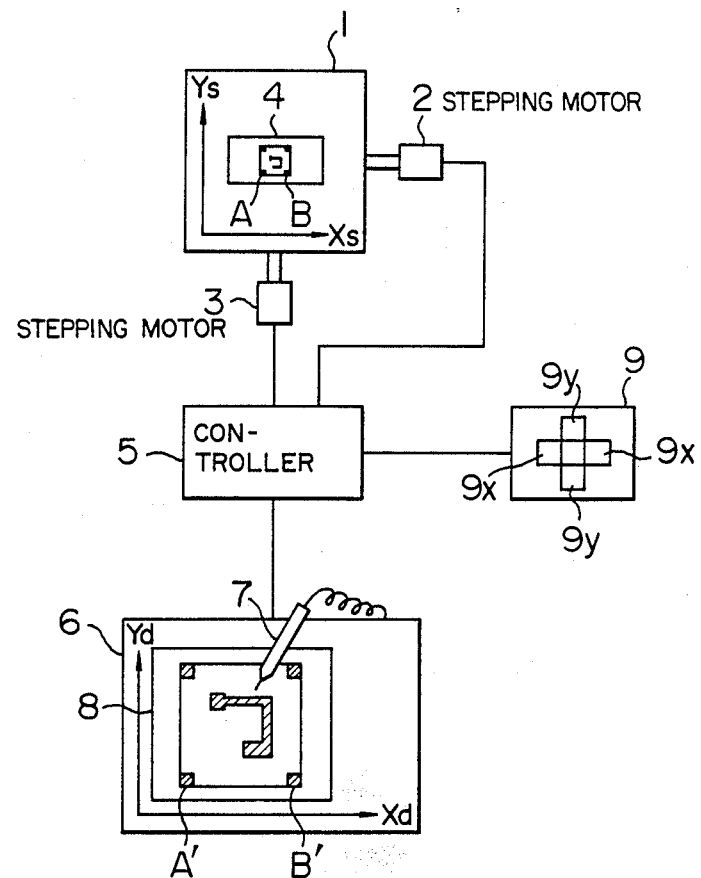
FIG. 1 is a schematic diagram showing a prior art drive apparatus for a specimen stage of a microscope.
Figure 2:
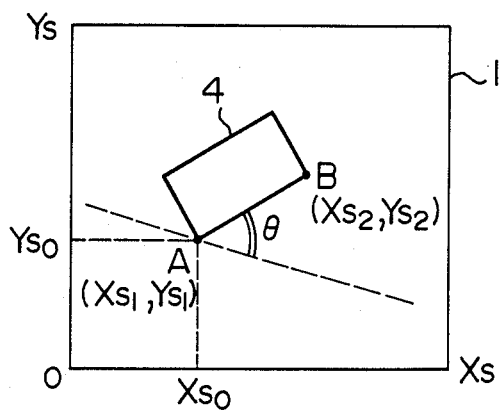
FIG. 2 is a diagram for explaining the principle of coordinate conversion according to the invention.
Figure 2:
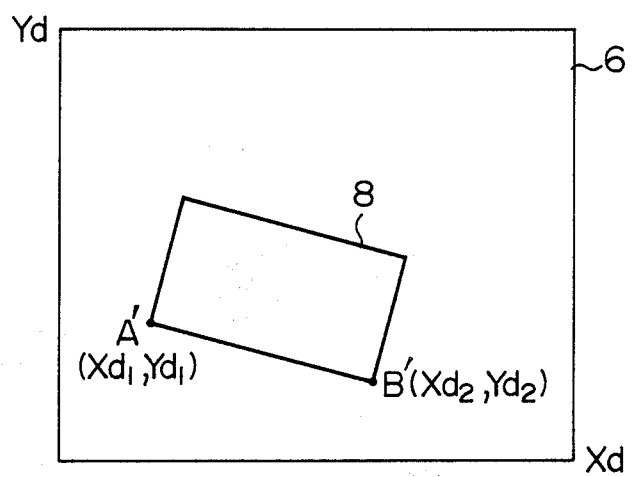
Figure 3:
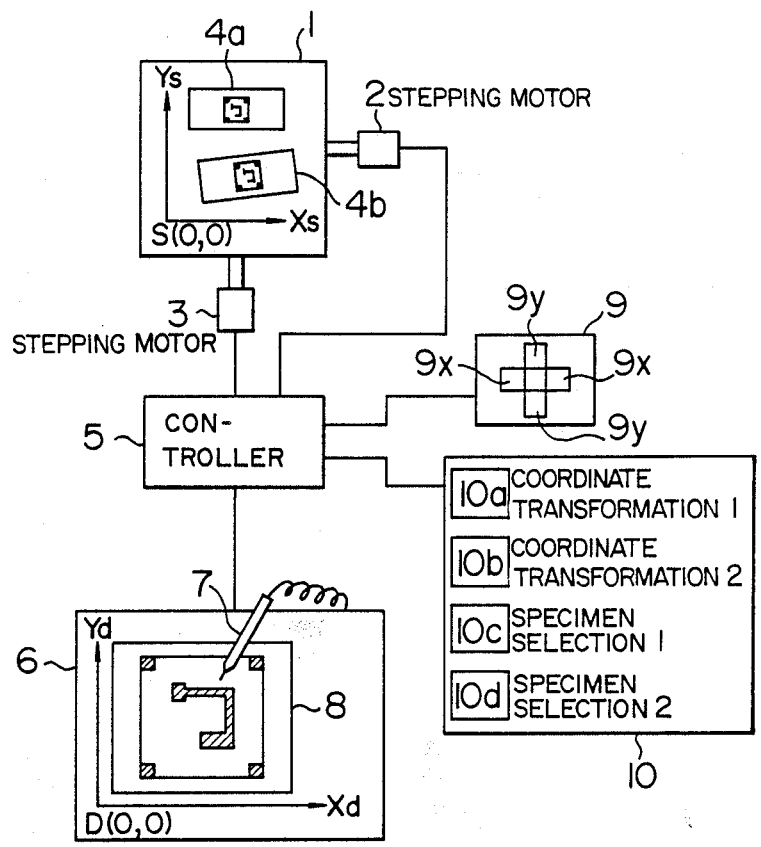
FIG. 3 is a schematic diagram showing a microscope specimen stage driving apparatus according to an embodiment of the invention.

Referring now to FIG. 3, a drive apparatus for a specimen stage of a microscope according to an embodiment of the invention will now be described.

In FIG. 3, the specimen stage 1 is driven in two orthogonal directions (X-axis direction and Y-axis direction) by means of the stepping motors 2 and 3. The specimen stage 1 can carry a plurality of specimens 4a and 4b as far as they can be confined within a movable range of the specimen stage. The controller 5 issues a requisite number of pulses to drive the pulse motors 2 and 3 so that the specimen stage 1 may be moved to a desired position which is referenced to a mechanical original position S (0, 0) for the specimen stage 1. In this embodiment, two integrated circuits of the same configuration are carried on the specimen stage 1, with top surfaces of their packages removed for permitting integrated circuit chips to be observed. The coordinate digitizer 6 is equivalent to an input unit widely used in a computer and it delivers, when a desired position on the top surface of the coordinate digitizer 6 is designated by the stylus pen 7 having a metal tip, signals representative of distances (Xd, Yd) on X and Y axes by which the designated position is distant from an original position D (0, 0). Placed on the top surface of the coordinate digitizer 6 is the layout drawing 8 illustrative of a structural configuration common to the specimens 4a and 4b (integrated circuit chips). As the layout drawing, either a copy of a layout design figure which is on a reduced scale complying with the size of the coordinate digitizer 6 or an enlarged photograph indicative of the entirety of the specimen itself are available.

The controller 5 is also connected to the manual switch 9 and a function selecting switch 10. The manual switch 9 has horizontal push buttons 9x and vertical push buttons 9y. When the manual switch 9 is operated, either the stepping motor 2 or 3 is driven through the controller 5 to move the specimen stage 1 in accordance with depression of either a horizontal push button 9x or a vertical push button 9y.

The operational procedure in the present embodiment will now be described.

Referring to FIG. 3, the manual switch 9 is first operated to move a featuring position of the first specimen 4a (for example, a corner of a bonding pad of the integrated circuit) into the center of view field of the microscope and then a switch 10a of the function selecting switch 10 is operated to perform coordinate transformation for the first specimen 4a. This places the controller 5 in condition for waiting for an input signal from the coordinate digitizer 6. Subsequently, a corresponding position on the layout drawing 8 placed on the coordinate digitizer 6 is designated by the stylus pen 7. The controller 5 stores coordinates $(Xd_{1-1}, Yd_{1-1})$ delivered out of the coordinate digitizer 6 at that time, along with coordinates $(Xs_{1-1}, Ys_{1-1})$ of the specimen stage 1 positioned at that time. Thereafter, the manual switch 9 is again operated to move a different featuring position of the first specimen 4a (for example, a corner of another bonding pad) into the center of view field of the microscope and a corresponding position on the layout drawing 8 is similarly designated by the stylus pen 7. The controller 5 stores coordinates $(Xd_{1-2}, Yd_{1-2})$ delivered out of the coordinate digitizer 6 at that time and coordinates $(Xs_{1-2}, Ys_{1-2})$ of the specimen stage 1 positioned at that time and it calculates, on the basis of the thus inputted four sets of coordinates $(Xd_{1-1}, Yd_{1-1})$, $(Xs_{1-1}, Ys_{1-1})$ and $(Xd_{1-2}, Yd_{1-2})$, $(Xs_{1-2}, Ys_{1-2})$, parameters $K_1$, $\theta_1$, $Xo_1$, $Yo_1$ pursuant to the aforementioned equation (3) for the first specimen 4a and stores the calculated parameters. Subsequently, a switch 10b of the function selecting switch 10 is operated to perform coordinate transformation for the second specimen and the manual switch 9 is then operated to sequentially move two featuring positions of the second specimen 4b which resemble those of the first specimen used for its coordinate transformation into the center of view field of the microscope. Thereafter, corresponding positions on the layout drawing are sequentially designated. The controller 5 utilizes two sets of coordinates $(Xd_{2-1}, Yd_{2-1})$ and $(Xd_{2-2}, Yd_{2-2})$ delivered out of the coordinate digitizer 6 and two sets of coordinates $(Xs_{2-1}, Ys_{2-1})$ and $(Xs_{2-2}, Ys_{2-2})$ of the specimen stage 1 positioned at that time so as to calculate and store parameters $K_2$, $\theta_2$, $Xo_2$ and $Yo_2$ for the second 4b, as in the case of the first specimen. Through the above operational procedure, the correspondence between each of the two specimens of identical configuration carried on the specimen stage 1 and the layout drawing can be set up.

Under this condition, a position desired to be observed on the first specimen 4a can practically be moved into the view field of the microscope as will be described below. More particularly, a switch 10C of the function selecting switch 10 is operated for selection of the first specimen 4a and a position desired to be observed on the layout drawing 8 is designated by the the stylus pen 7. The controller 5 now bases itself on the previously stored parameters $K_1$, $\theta_1$, $Xo_1$ and $Yo_1$ for the first specimen 4a to apply the aforementioned equations (1) and (2) to coordinates (Xd, Yd) delivered out of the coordinate digitizer 6, thereby calculating coordinates (Xs, Ys) for the specimen stage and drives the stepping motors 2 and 3 so that the specimen stage 1 can be positioned at the thus calculated coordinates. Similarly, for the second specimen 4b, following the operation of a switch 10d of function selecting switch 10 for selecting the second specimen 4b, quite the same operation as above is carried out. The controller 5 now bases itself on the parameters $K_2$, $\theta_2$, $Xo_2$ and $Yo_2$ for the second specimen 4b to calculate coordinates for the specimen stage.

For comparative observation and measurement of the two specimens, a position on the layout drawing which is identically associated with each specimen may conveniently be designated by the stylus pen 7.

Figure 4:
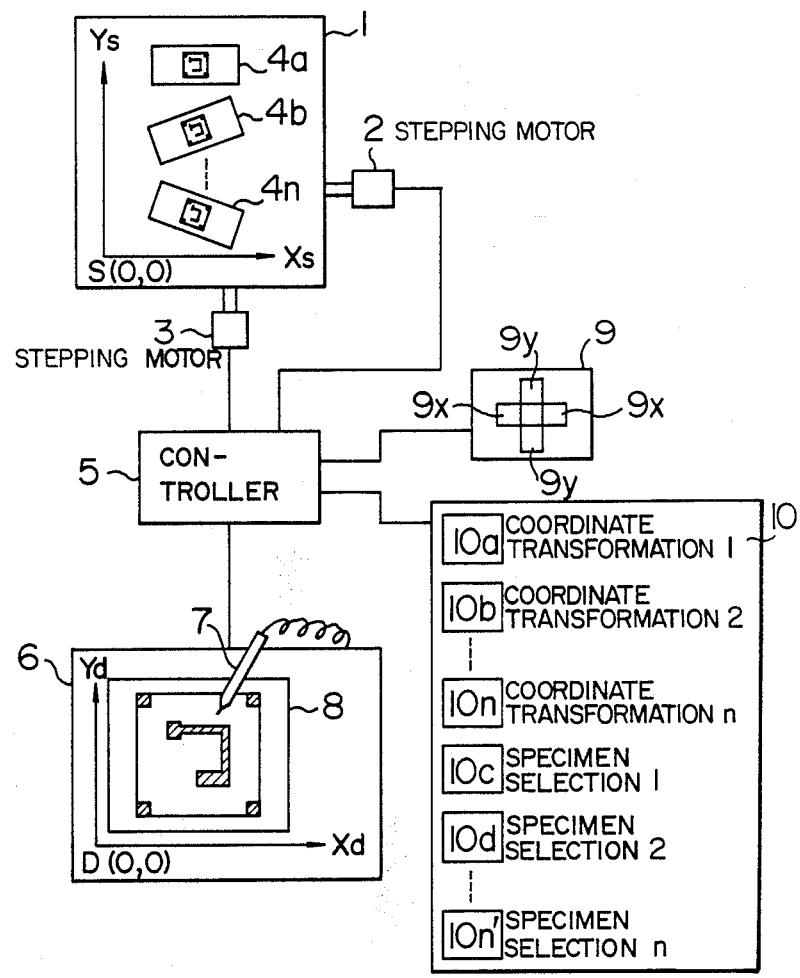
FIG. 4 is a schematic diagram showing another embodiment of the invention.

Although the present embodiment shown in FIG. 3 has been described by referring to two specimens, the number of specimens may be three or more as in another embodiment of FIG. 4 wherein the same operational procedure as described previously can be applied to specimens 4a, 4b—4n.

Specifically, in the embodiment of FIG. 4, a switch 10n adapted to perform coordinate transformation an n-th specimen and a switch 10n' adapted to select the n-th specimen are additionally provided in the function selecting switch 10 shown in FIG. 3.

In this case, the correspondence between the coordinate system $(X_{sn}, Y_{sn})$ for the specimen stage 1 and the coordinate system $(X_{dn}, Y_{dn})$ on coordinate digitizer 6 are expressed as follows and calculated by the controller 5.

$$Xsn = Kn(Xd \cos\theta n - Yd \sin\theta n) + Xson \quad (4)$$

$$Ysn = Kn(Yd \cos\theta n - Xd \sin\theta_{in}) + Yson \qquad (5)$$

parameters are expressed as follows:

$$\left. \begin{array}{l} Kn = \sqrt{\dfrac{(Xd_{n-2} - Xd_{n-1})^2 + (Yd_{n-2} - Yd_{n-1})^2}{(Xs_{n-2} - Xs_{n-1})^2 + (Ys_{n-2} - Ys_{n-1})^2}} \\[2ex] \theta n = \tan^{-1}\left[\dfrac{Xs_{n-2} - Xs_{n-1}}{Ys_{n-2} - Ys_{n-1}}\right] - \tan^{-1}\left[\dfrac{Xd_{n-2} - Xd_{n-1}}{Yd_{n-2} - Yd_{n-1}}\right] \\[2ex] Xon = Xs_{n-1} - Kn(Xd_{n-1}\cos\theta n - Yd_{n-1}\cos\theta n) \\[1ex] Yon = Ys_{n-1} - Kn(Yd_{n-1}\cos\theta n - Xd_{n-1}\sin\theta n) \end{array} \right\} \qquad (6)$$

According to this invention, a stepping motor is recited as moving means for moving said specimen stage in the two-dimensional directions. However, a d.c. motor may be used instead of it.

Furthermore, a stylus pen is recited as designating means for designating a desired position on the coordinate digitizer. However, a crosshair cursor may be used instead of it.

As described above, according to the invention, when a plurality of specimens of an identical structural configuration are to be observed and measured with a microscope, the mutual positional relationship between the plural specimens need not be determined with high accuracy and besides, a desired position can be moved easily and quickly into the view field of the microscope by merely designating a corresponding position on a single layout drawing. Therefore, the present invention is significantly efficient for comparative observation of a position which is identically associated with the plurality of specimens. For example, in the case of analyzing a defective integrated circuit device, a non-defective integrated circuit device is carried, together with the defective one, on the specimen stage, and a part of one device and a corresponding part of the other device are alternately observed to locate a faulty portion.

I claim:

1. A specimen stage drive apparatus for a microscope comprising:

a specimen stage carrying a plurality of specimens of the same structural configuration and movable in two-dimensional directions;

a moving means connected to said specimen stage to move it in the two-dimensional directions;

two-dimensional coordinates designating means on which a drawing illustrative of an internal structural configuration of said specimens is placed;

designating means for designating a desired position on said two-dimensional coordinates designating means;

a controller, connected between each moving means and said two-dimensional coordinates designating means, for correctively setting up correspondence between a coordinate system (Xd, Yd) on said two-dimensional coordinates designating means and a coordinate system (Xs, Ys) for said specimen stage and for controlling said specimen stage such that it is moved to a position of said coordinate system (Xs, Ys) which corresponds to a designated coordinate position on said two-dimensional coordinates designating means;

a manual driving means connected to said controller to drive said moving means; and a function selecting means connected to said controller to perform selection of said specimens and coordinate correction, whereby a coordinate position on said two-dimensional coordinates designating means is made to correctively correspond to a plurality of coordinate positions on said specimen stage independently.

2. A specimen stage drive apparatus for a microscope according to claim 1 wherein coordinate values indicative of two points of a specimen are inputted to said apparatus to set up the correspondence between coordinate system on said two-dimensional coordinates designating means and coordinate system for said specimen stage.

3. A specimen stage drive apparatus for a microscope according to claim 1 wherein said controller has (1) a function of calculating a plurality of parameter sets each corresponding to each of plural specimens and storing calculated parameter sets separately, $$Kn = \sqrt{\dfrac{(Xd_{n-2} - Xd_{n-1})^2 + (Yd_{n-2} - Yd_{n-1})^2}{(Xs_{n-2} - Xs_{n-1})^2 + (Ys_{n-2} - Ys_{n-1})^2}}$$

$$\theta n = \tan^{-1}\left[\dfrac{Xs_{n-2} - Xs_{n-1}}{Ys_{n-2} - Ys_{n-1}} - \tan^{-1}\dfrac{Xd_{n-2} - Xd_{n-1}}{Yd_{n-2} - Yd_{n-1}}\right]$$

$$Xon = Xs_{n-1} - Kn(Xd_{n-1}\cos\theta n - Yd_{n-1}\cos\theta n)$$

$$Yon = Ys_{n-1} - Kn(Yd_{n-1}\cos\theta n - Xd_{n-1}\sin\theta n)$$

where $\theta n$: relative angle between an n-th specimen (n:integer n>1) and a layout drawing illustrative of an internal structural configuration of specimens, $Xs_1, Ys_1, Xs_2, Ys_2$: coordinate values on said specimen stage, $Xd_1, Yd_1, Xd_2, Yd_2$: coordinate values on said two-dimensional coordinates designating means, and (2) a function of selecting said parameters Kn, $\theta n$, Xon and Yon, and calculating a coordinate position (Xsn, Ysn) on said n-th specimen stage in accordance with $$Xsn = Kn(Xd \cos\theta n - Yd \cos\theta n) + Xson$$

$$Ysn = Kn(Yd \cos\theta n + Xd \cos\theta n) + Yson,$$

where Xso and Yso represent reference coordinate values, to thereby move said n-th specimen stage to a desired position.

* * * * *